United States Patent
Ray et al.

(10) Patent No.: US 8,335,205 B2
(45) Date of Patent: Dec. 18, 2012

(54) PRE-BUNDLING OF RLC SDUS IN THE RLC LAYER

(75) Inventors: Siddharth Ray, Bridgewater, NJ (US); Ashwin Sampath, Skillman, NJ (US); Arnaud Meylan, Juziers (FR); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 12/643,667

(22) Filed: Dec. 21, 2009

(65) Prior Publication Data
US 2010/0165936 A1    Jul. 1, 2010

Related U.S. Application Data

(60) Provisional application No. 61/139,912, filed on Dec. 22, 2008.

(51) Int. Cl.
*H04J 3/24* (2006.01)
(52) U.S. Cl. ........................ 370/349; 370/474
(58) Field of Classification Search .......... 370/349–350, 370/474
See application file for complete search history.

(56) References Cited

U.S. PATENT DOCUMENTS

| 7,190,701 | B2 | 3/2007 | Yi et al. |
| 7,961,704 | B2* | 6/2011 | Meyer et al. ................. 370/349 |
| 2008/0137601 | A1 | 6/2008 | Sung et al. |
| 2008/0165805 | A1 | 7/2008 | Terry et al. |
| 2008/0192748 | A1* | 8/2008 | Kim et al. ...................... 370/394 |
| 2008/0225891 | A1* | 9/2008 | Cave et al. ..................... 370/472 |
| 2008/0226074 | A1 | 9/2008 | Sammour et al. |
| 2009/0091810 | A1* | 4/2009 | Yoshinari et al. ................. 359/3 |
| 2011/0164664 | A1* | 7/2011 | Torsner et al. ................ 375/219 |

FOREIGN PATENT DOCUMENTS

EP    1211868 A2    6/2002

OTHER PUBLICATIONS

International Search Report and Written Opinion—PCT/US2009/069319, International Search Authority—European Patent Office—May 17, 2010.
Ericsson, "Support for Flexible RLC PDU Sizes in UL", 3GPP TSG-RAN WG #59-bis, R2-074033, (Shanghai, China, Oct. 8-12, 2007), pp. 1-5.
Taiwan Search Report—TW098144375—TIPO—Aug. 8, 2006.

* cited by examiner

*Primary Examiner* — Phuc Tran
(74) *Attorney, Agent, or Firm* — Nerrie M. Zohn (57) ABSTRACT

Certain aspects of the present disclosure provide a technique for pre-bundling the received service data units (SDU) into an SDU bundle in a first communication layer before receiving a scheduling information from a second communication layer and adjusting the SDU bundle when the scheduling information is received.

26 Claims, 7 Drawing Sheets

PRE-BUNDLING OF RLC SDUS IN THE RLC LAYER

CLAIM OF PRIORITY UNDER 35 U.S.C. §119

The present application for patent claims benefit of U.S. Provisional Patent Application Ser. No. 61/139,912 filed Dec. 22, 2008, entitled, "Pre-Bundling of RLC SDUs in the RLC Layer," and assigned to the assignee hereof and hereby expressly incorporated by reference herein.

TECHNICAL FIELD

Certain embodiments of the present disclosure generally relate to wireless communications and, more particularly, to pre-bundling of received service data units (SDUs) in a communication layer.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input-single-output, multiple-input-single-output or a multiple-input-multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In a wireless multiple-access communication system, transmitters and receivers may communicate using a multiple layer communication stack. The layers may include, for example, a physical layer, a medium access control (MAC) layer, a radio link control (RLC) layer, a protocol layer (e.g., packet data convergence protocol (PDCP) layer), an application layer and so on. The RLC layer receives service data units (SDU) from the PDCP layer, and concatenates and/or segments the SDUs into RLC protocol data units (PDU) for transmission to the MAC layer.

SUMMARY

Certain embodiments provide a method for wireless communications. The method generally includes concatenating one or more received service data units (SDU) to generate an SDU bundle in a first communication layer, receiving a scheduling decision from a second communication layer, adjusting the SDU bundle based on the scheduling decision, and sending the adjusted SDU bundle to the second communication layer.

Certain embodiments provide an apparatus for wireless communications. The apparatus generally includes logic for concatenating one or more received service data units (SDU) to generate an SDU bundle in a first communication layer, logic for receiving a scheduling decision from a second communication layer, logic for adjusting the SDU bundle based on the scheduling decision, and logic for sending the adjusted SDU bundle to the second communication layer.

Certain embodiments provide an apparatus for wireless communications. The apparatus generally includes means for concatenating one or more received service data units (SDU) to generate an SDU bundle in a first communication layer, means for receiving a scheduling decision from a second communication layer, means for adjusting the SDU bundle based on the scheduling decision, and means for sending the adjusted SDU bundle to the second communication layer.

Certain aspects provide a computer-program product for wireless communications, comprising a computer-readable medium having instructions stored thereon, the instructions being executable by one or more processors. The instructions generally include instructions for instructions for concatenating one or more received service data units (SDU) to generate an SDU bundle in a first communication layer, instructions for receiving a scheduling decision from a second communication layer, instructions for adjusting the SDU bundle based on the scheduling decision, and instructions for sending the adjusted SDU bundle to the second communication layer.

Certain aspects of the present disclosure provide an apparatus for wireless communications. The apparatus generally includes at least one processor configured to concatenate one or more received service data units (SDU) to generate an SDU bundle in a first communication layer, receive a scheduling decision from a second communication layer, adjust the SDU bundle based on the scheduling decision, and send the adjusted SDU bundle to the second communication layer.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
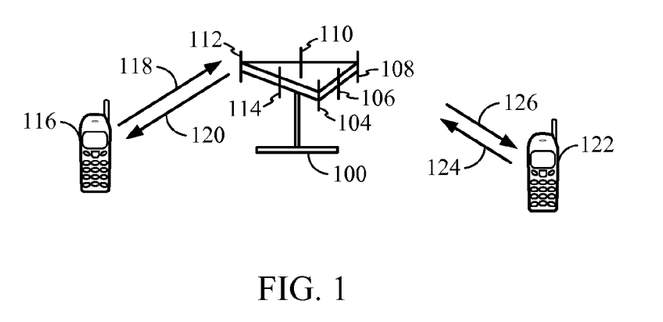
FIG. 1 illustrates a multiple access wireless communication system, in accordance with certain embodiments of the present disclosure.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
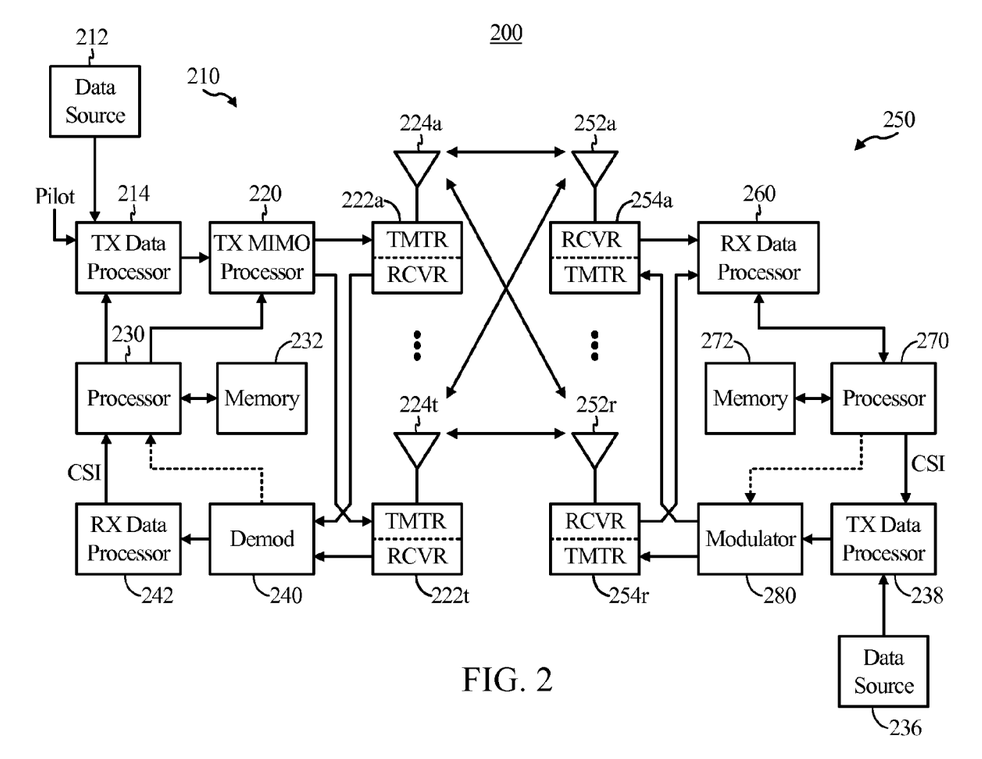
FIG. 2 illustrates a block diagram of a communication system, in accordance with certain embodiments of the present disclosure.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Pre-Bundling of RLC SDUs in the RLC Layer

Certain embodiments of the present disclosure present techniques for pre-bundling of service data units (SDU) in a communication layer in order to decrease the processing time after receiving scheduling information from other layers. An SDU is a set of data that is sent by a user of the services of a given layer, and is transmitted unchanged to a peer service user.

Figure 3:
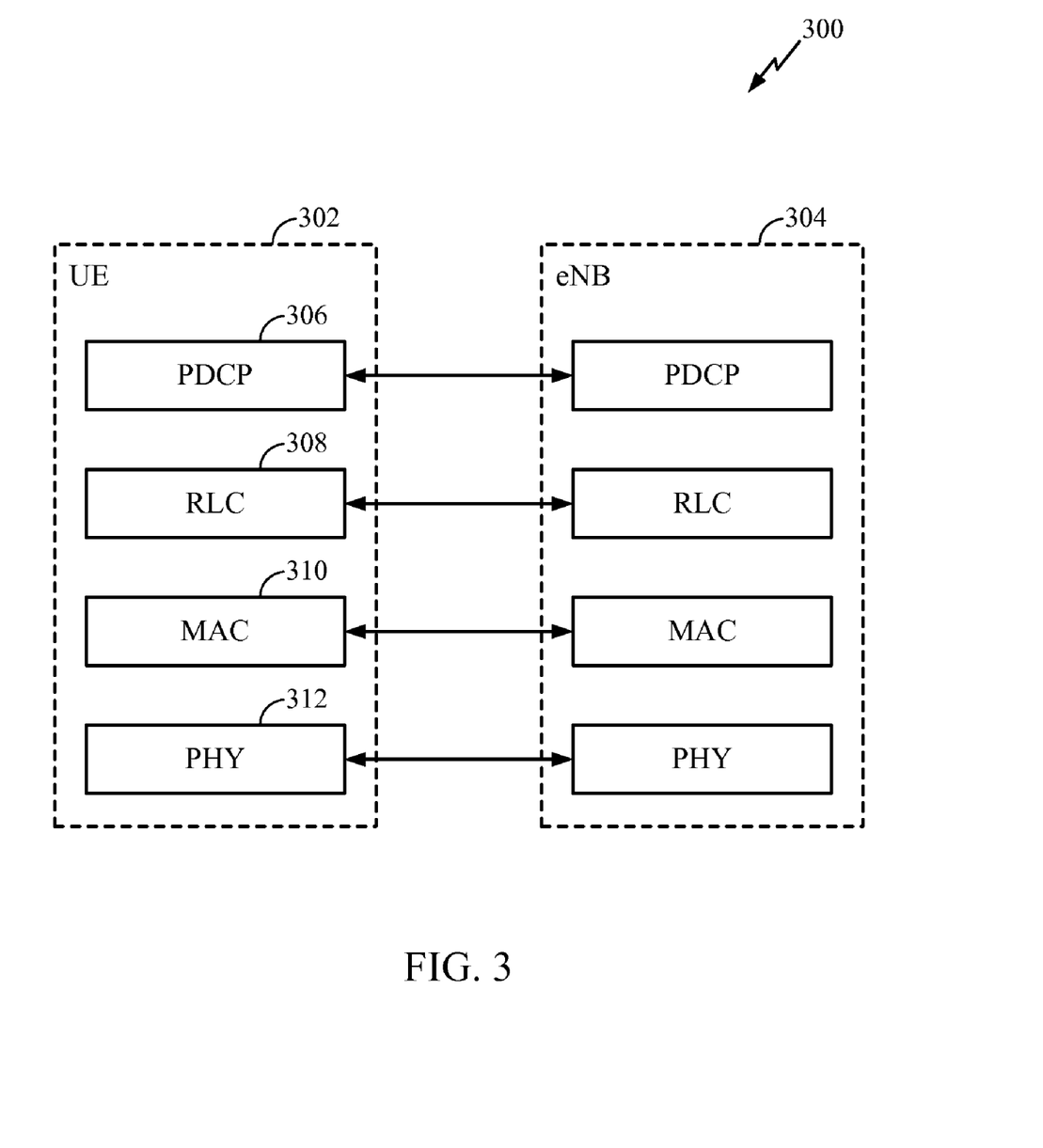
FIG. 3 illustrates protocol stacks for a user equipment and an evolved node B (eNB) in the LTE standard.

In a wireless communication system, transmitters and receivers may communicate using a multiple layer protocol stack. FIG. 3 illustrates protocol stacks for a user equipment (UE) 302 and an evolved node B (eNB) 304 in the LTE standard. The protocol stack may include a packet data convergence protocol (PDCP) layer 306, a radio link control (RLC) layer 308, a medium access control (MAC) layer 310 and a physical (PHY) layer 312. Each layer receives a plurality of SDUs from a higher layer and adds headers to the SDUs to generate protocol data units (PDU) and transmits the PDUs to a lower layer. The PDUs are treated as SDUs by the lower layer.

In the LTE standard, the RLC layer receives RLC SDUs from the PDCP layer. Upon receiving a scheduling decision from the medium access control (MAC) layer, the RLC SDUs are concatenated and/or segmented in the RLC layer to generate an RLC PDU. Since the SDUs are continually received from the protocol layer, the RLC layer should create the related RLC PDUs without delay to avoid service delays. Therefore, the segmentation and concatenation need to be completed under an absolute time budget. Complexity of segmentation and concatenation operations grows as the number of received SDUs increases.

Figure 4:
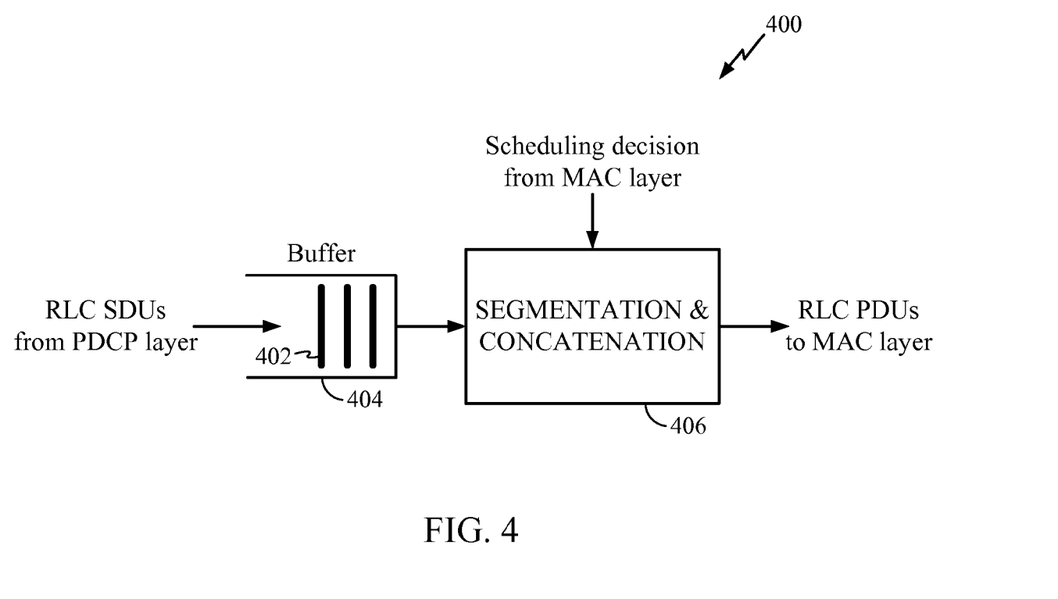
FIG. 4 illustrates an example block diagram of the segmentation and concatenation processes performed in a radio link control (RLC) layer.

FIG. 4 illustrates an example block diagram 400 of the segmentation and concatenation processes performed in a radio link control (RLC) layer. A plurality of RLC SDUs 402 are received from a PDCP layer and stored in a buffer 404 in the RLC layer. When a scheduling decision is received from a MAC layer, the segmentation and concatenation block 406, concatenates the received RLC SDUs and segments them according to the sizing information in the scheduling decision to generate RLC PDUs. The RLC PDUs are then sent to the MAC layer for further processing.

For certain embodiments of the present disclosure, the complexity of segmentation and concatenation processes may be reduced by pre-bundling the SDUs before receiving the scheduling decision. This may result in savings in processing time after reception of the scheduling decision, which may have a strict time budget. In one example, the RLC SDUs received from a protocol data convergence protocol (PDCP) layer may be pre-bundled at the RLC layer before the scheduling decision is received from the MAC layer. Pre-bundling the RLC SDUs may require creating appropriate RLC headers and payload. It should be noted that the pre-bundling and header creation are performed offline.

Size of an SDU bundle may change based on the average packet rate for the corresponding flow, such as internet protocol (IP) flow and so on. For certain embodiments, when a scheduling decision is received by the RLC layer, size of the SDU bundle may also be increased or decreased based on the amount of bytes scheduled. The RLC headers may also be adjusted appropriately. For certain embodiments, segmentation may be performed to fit the RLC SDUs into one or more MAC packets.

For certain embodiments, if the bundle size is the same as the amount of bytes scheduled for the RLC SDU bundle, the RLC SDU bundle may be submitted to the MAC layer as the RLC PDU with minor modifications, such as adding a serial number to the RLC SDU bundle.

For certain embodiments, the RLC SDU bundle may be treated as a PDU which is going to be re-transmitted to the MAC layer although the RLC SDU bundle has not been transmitted before. Hence, the bundle may be re-segmented, and its header can be created based on the header in the RLC SDU bundle.

Figure 5:
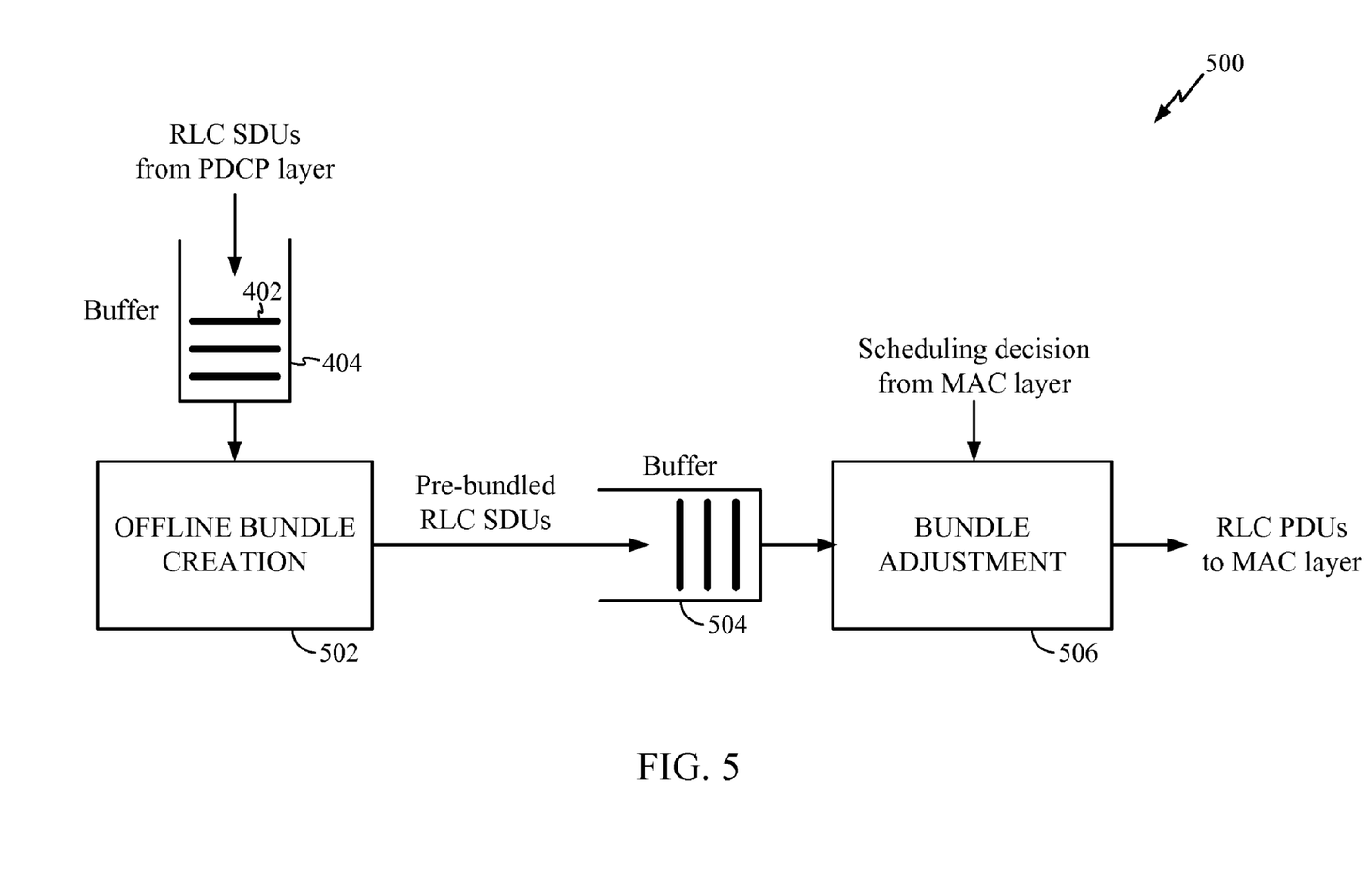
FIG. 5 illustrates an example block diagram of a pre-bundling technique in a communication layer, in accordance with certain embodiments of the present disclosure.

FIG. 5 illustrates an example block diagram 500 of the proposed pre-bundling and bundle adjustment technique, in accordance with certain embodiments of the present disclosure. A plurality of RLC SDUs is received from a PDCP layer and stored in a buffer 404. An offline bundle creator 502 receives the RLC SDUs and bundles the RLC SDUs into one or more RLC SDU bundles before receiving a scheduling decision from a MAC layer. The process of concatenating the received SDUs into SDU bundles before receiving the scheduling decisions from another layer may be called 'pre-bundling.'

The pre-bundling process may be performed based at least on an average packet rate for a corresponding protocol flow, such as an IP flow. Therefore, the offline bundle creator 502 generates the appropriate RLC headers and payload for the bundle. The pre-bundled RLC SDUs 504 may be stored in a buffer. After receiving a scheduling decision from the MAC layer, the bundle adjustor 506 increases or decreases the size of the RLC SDU bundle based at least on the information in the scheduling decision to generate one or more RLC PDUs.

In one example, the scheduling decision from the MAC layer may comprise a number of bytes (or other measurements of a PDU size). If the PDU size is larger than the size of the SDU bundle, the bundle adjustor 506 may concatenate two or more SDU bundles and then adjust (e.g., segment) the concatenated SDU bundle to generate an SDU bundle with a size equal to the PDU size in the scheduling decision. If the PDU size is smaller than the size of the SDU bundle, the bundle adjustor 506 may decrease the size of the SDU bundle to match the number of bytes scheduled.

For certain embodiments, by pre-bundling the SDUs, the processing resources required to create the RLC PDUs are distributed across the time domain from the time of reception of the RLC SDUs instead of the time of reception of the scheduling decision. It should be noted that adjusting the bundle after the decision is received takes less time than generating the entire bundle.

For certain embodiments of the present disclosure, the bundle created by the offline bundle creator 502 may be treated as a PDU that needs to be re-transmitted (e.g., in a re-transmission communication scheme, such as automatic repeat-request (ARQ), hybrid ARQ (HARM), and/or the like). The bundle may then be re-segmented by a re-transmission engine (not shown in FIG. 5). In addition, the headers may be created based on the headers that were created in the pre-bundling process.

Figure 6:
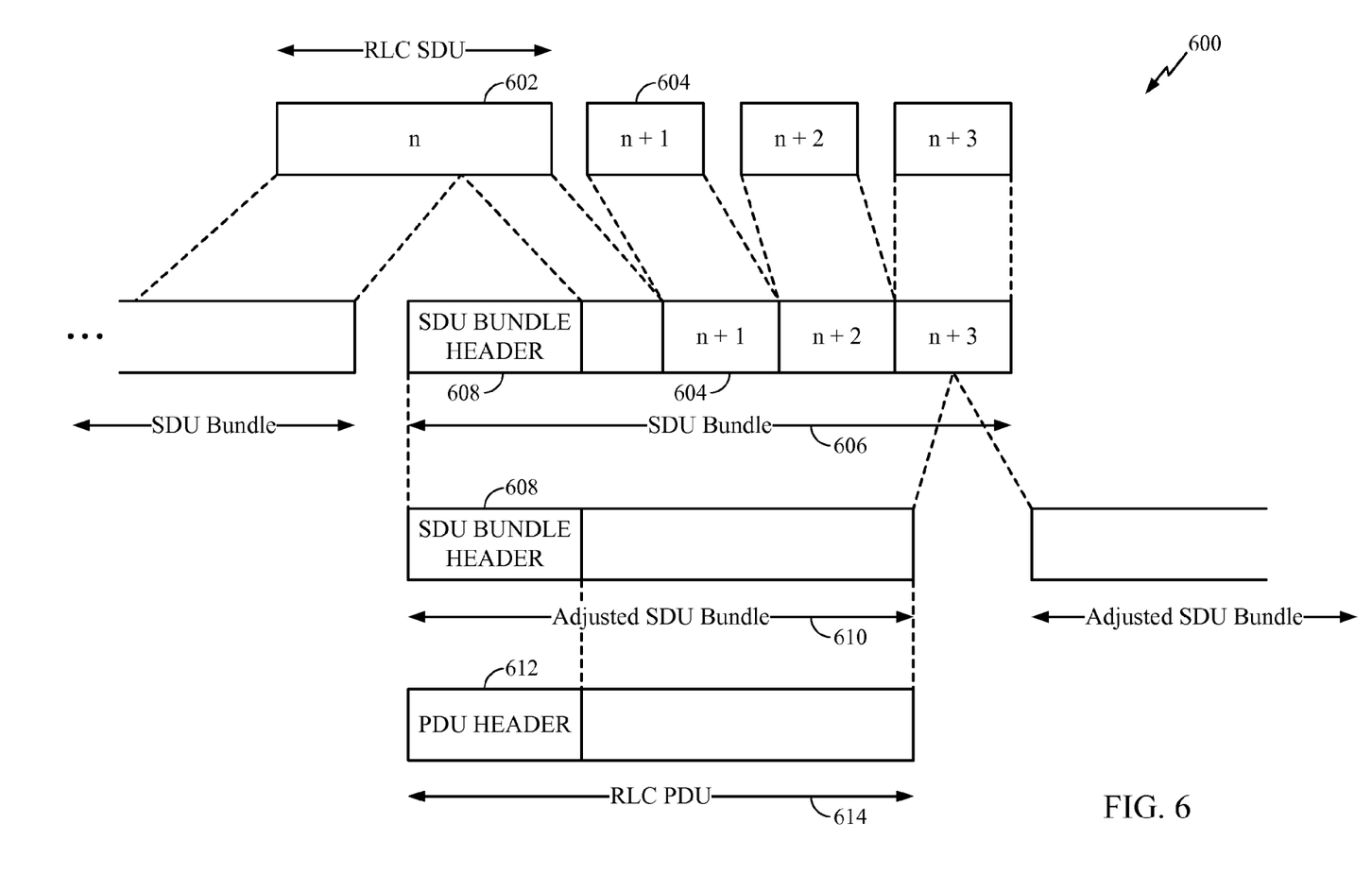
FIG. 6 illustrates the RLC bundle creation, in accordance with certain embodiments of the present disclosure.

FIG. 6 illustrates the RLC bundle creation, in accordance with certain embodiments of the present disclosure. A plurality of RLC SDUs such as RLC SDU n 602, RLC SDU n+1 604 are bundled together to generate an SDU bundle 606. The SDU bundle may be created by concatenating and/or segmenting the RLC SDUs and creating a header 608 for the SDU bundle. When the scheduling decision is received from the MAC layer, the SDU bundle is adjusted based at least on the sizing information included in the scheduling decision. The adjusted SDU bundle 610 may be used to generate an RLC PDU 614. A PDU header 612 may also be created based on the SDU bundle header 608.

Figure 7:
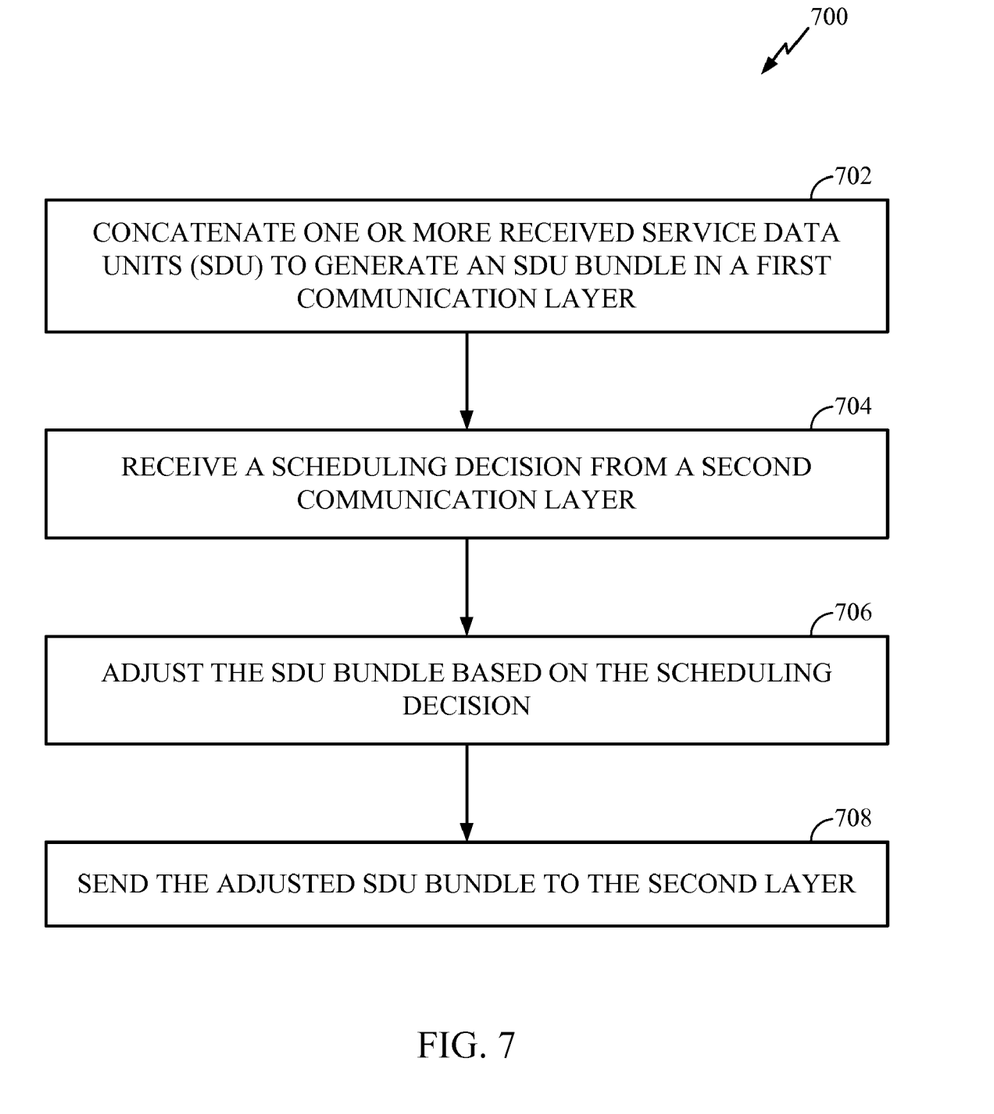
FIG. 7 illustrates example operations for pre-bundling service data units (SDU) to produce bundled SDUs, in accordance with certain embodiments of the present disclosure.

FIG. 7 illustrates example operations 500 for pre-bundling SDUs, in accordance with certain embodiments of the present disclosure. At 702, one or more SDUs are concatenated to generate an SDU bundle in a first communication layer. At 704, a scheduling decision is received from a second communication layer. For example, the first communication layer may be an RLC layer and the second communication layer may be a MAC layer. Therefore, the RLC layer may receive RLC SDUs from a PDCP layer.

At 706, the SDU bundle is adjusted based on the information included in the scheduling decision. For example, the scheduling decision may be received from the MAC layer and may include information regarding PDUs that are to be transmitted to the MAC layer, such as number of bytes expected, and/or the like.

Thus, the SDU bundle may be created before the arrival of the scheduling decision to spread processing resources over time. The SDU bundle may be adjusted once the scheduling decision is received. As described, the bundle may be adjusted by adding or removing one or more portions of one or more SDUs. At 708, the adjusted SDU bundle is sent to the second layer.

Certain embodiments of the present disclosure, presented techniques to reduce the processing time at a communication layer after receiving scheduling decision from other layers by pre-bundling the SDUs and adjusting the bundle when the information in the scheduling decision becomes available.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Figure 7A:
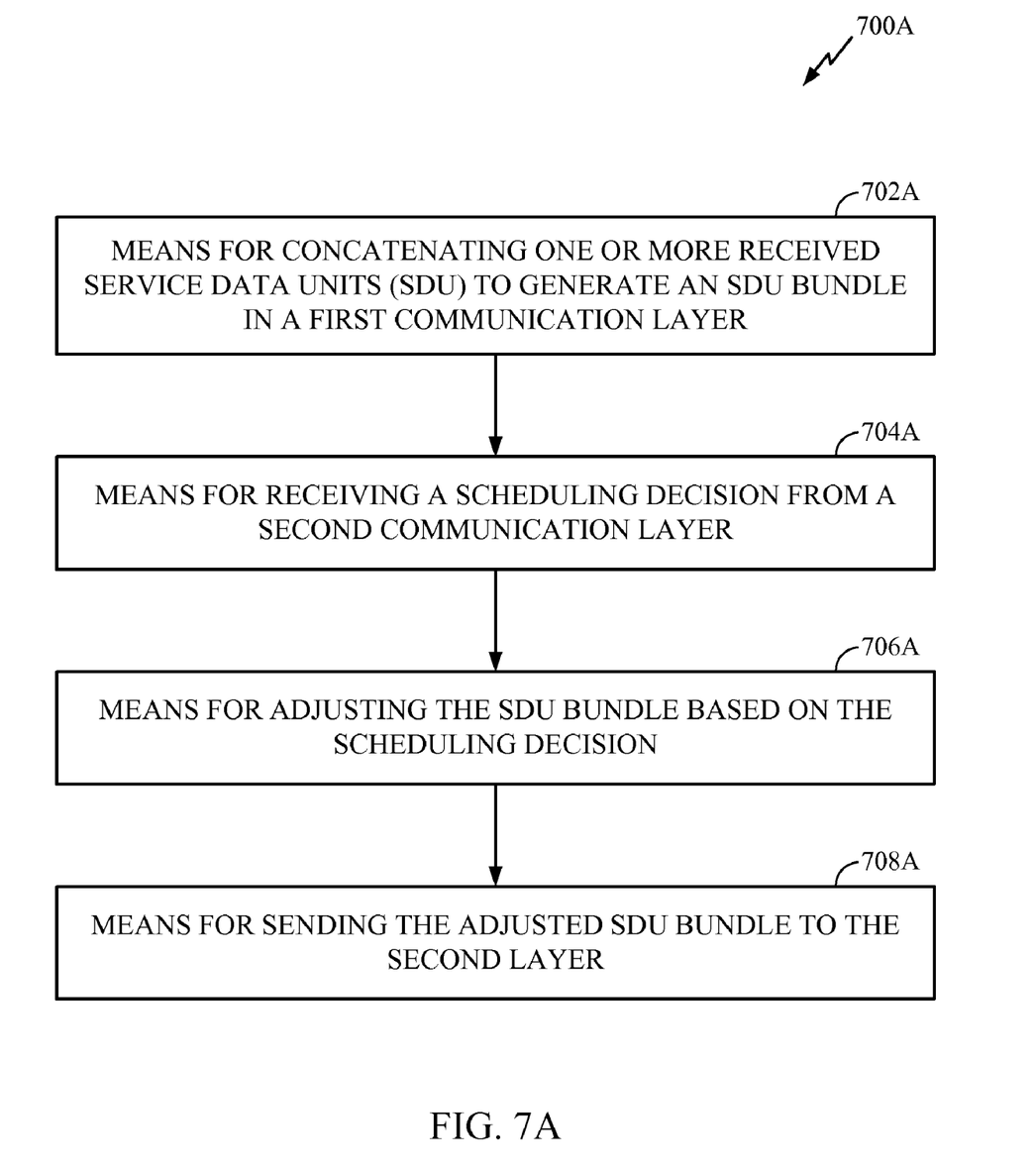
FIG. 7A illustrates example components capable of performing the operations illustrated in FIG. 7.

The various operations of methods described above may be performed by various hardware and/or software component(s) and/or module(s) corresponding to means-plus-function blocks illustrated in the Figures. For example, operations 700 illustrated in FIG. 7 correspond to means-plus-function blocks 700A illustrated in FIG. 7A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications, comprising:
    pre-bundling an service data units (SDU) bundle prior to receiving a scheduling decision, the pre-bundling including concatenating one or more received SDU to generate the SDU bundle in a first communication layer;
    receiving the scheduling decision from a second communication layer;
    adjusting the SDU bundle based on the scheduling decision; and
    sending the adjusted SDU bundle to the second communication layer.

2. The method of claim 1, wherein the first communication layer is a radio link control (RLC) layer and the second communication layer is a medium access control (MAC) layer.

3. The method of claim 1, wherein the scheduling decision comprises a size of a protocol data unit (PDU) for the second communication layer.

4. The method of claim 1, wherein adjusting the SDU bundle based on the scheduling decision comprises:
    adjusting size of the SDU bundle based at least on sizing information included in the scheduling decision; and
    adjusting a header of the SDU bundle.

5. The method of claim 1, wherein adjusting the SDU bundle based on the scheduling decision comprises:
    segmenting the SDU bundle based on information included in the scheduling decision.

6. The method of claim 5, further comprising:
    creating a header for the segmented SDU bundle based on a header of the SDU bundle.

7. The method of claim 1, wherein adjusting the SDU bundle based on the scheduling decision comprises:
    concatenating two or more SDU bundles to generate a concatenated SDU bundle; and
    adjusting the concatenated SDU bundle based on information included in the scheduling decision.

8. The method of claim 1, wherein size of the SDU bundle is determined based on an average packet rate for a corresponding flow.

9. An apparatus for wireless communications, comprising:
    logic for pre-bundling an service data units (SDU) bundle prior to receiving a scheduling decision, the pre-bundling including concatenating one or more received SDU to generate the SDU bundle in a first communication layer;
    logic for receiving the scheduling decision from a second communication layer;
    logic for adjusting the SDU bundle based on the scheduling decision; and
    logic for sending the adjusted SDU bundle to the second communication layer.

10. The apparatus of claim 9, wherein the first communication layer is a radio link control (RLC) layer and the second communication layer is a medium access control (MAC) layer.

11. The apparatus of claim 9, wherein the scheduling decision comprises a size of a protocol data unit (PDU) for the second communication layer.

12. The apparatus of claim 9, wherein the logic for adjusting the SDU bundle based on the scheduling decision comprises:
    logic for adjusting size of the SDU bundle based at least on sizing information included in the scheduling decision; and
    logic for adjusting a header of the SDU bundle.

13. The apparatus of claim 9, wherein the logic for adjusting the SDU bundle based on the scheduling decision comprises:
    logic for segmenting the SDU bundle based on information included in the scheduling decision.

14. The apparatus of claim 13, further comprising:
    logic for creating a header for the segmented SDU bundle based on a header of the SDU bundle.

15. The apparatus of claim 9, wherein the logic for adjusting the SDU bundle based on the scheduling decision comprises:
    logic for concatenating two or more SDU bundles to generate a concatenated SDU bundle; and
    logic for adjusting the concatenated SDU bundle based on information included in the scheduling decision.

16. The apparatus of claim 9, wherein size of the SDU bundle is determined based on an average packet rate for a corresponding flow.

17. An apparatus for wireless communications, comprising:
    means for pre-bundling an service data units (SDU) bundle prior to receiving a scheduling decision, wherein the means for pre-bundling concatenates one or more received SDU to generate the SDU bundle in a first communication layer;
    means for receiving the scheduling decision from a second communication layer;
    means for adjusting the SDU bundle based on the scheduling decision; and
    means for sending the adjusted SDU bundle to the second communication layer.

18. The apparatus of claim 17, wherein the first communication layer is a radio link control (RLC) layer and the second communication layer is a medium access control (MAC) layer.

19. The apparatus of claim 17, wherein the scheduling decision comprises a size of a protocol data unit (PDU) for the second communication layer.

20. The apparatus of claim 17, wherein the means for adjusting the SDU bundle based on the scheduling decision comprises:
means for adjusting size of the SDU bundle based at least on sizing information included in the scheduling decision; and
means for adjusting a header of the SDU bundle.

21. The apparatus of claim 17, wherein the means for adjusting the SDU bundle based on the scheduling decision comprises:
means for segmenting the SDU bundle based on information included in the scheduling decision.

22. The apparatus of claim 21, further comprising:
means for creating a header for the segmented SDU bundle based on a header of the SDU bundle.

23. The apparatus of claim 17, wherein the means for adjusting the SDU bundle based on the scheduling decision comprises:
means for concatenating two or more SDU bundles to generate a concatenated SDU bundle; and
means for adjusting the concatenated SDU bundle based on information included in the scheduling decision.

24. The apparatus of claim 17, wherein size of the SDU bundle is determined based on an average racket rate for a corresponding flow.

25. A non-transitory computer readable medium comprising a computer-program product for wireless communications, the computer readable medium having instructions stored thereon, the instructions being executable by one or more processors and the instructions comprising:
instructions for pre-bundling an service data units (SDU) bundle prior to receiving a scheduling decision, the pre-bundling including concatenating one or more received SDU to generate the SDU bundle in a first communication layer;
instructions for receiving the scheduling decision from a second communication layer;
instructions for adjusting the SDU bundle based on the scheduling decision; and
instructions for sending the adjusted SDU bundle to the second communication layer.

26. An apparatus for wireless communications, comprising at least one processor configured to:
pre-bundle an service data units (SDU) bundle prior to receiving a scheduling decision, the pre-bundling including concatenating one or more received SDU to generate an SDU bundle in a first communication layer;
receive a scheduling decision from the second communication layer;
adjust the SDU bundle based on the scheduling decision; and
send the adjusted SDU bundle to the second communication layer.

* * * * *